US012572712B2

(12) United States Patent
Zhang et al.

(10) Patent No.: US 12,572,712 B2
(45) Date of Patent: Mar. 10, 2026

(54) PHYSICAL DIGITAL TWIN MODELING METHOD AND APPARATUS FOR ASSEMBLY, ELECTRONIC DEVICE AND MEDIUM

(71) Applicant: BEIJING INSTITUTE OF TECHNOLOGY, Beijing (CN)

(72) Inventors: Zhijing Zhang, Beijing (CN); Qimuge Saren, Beijing (CN); Xin Jin, Beijing (CN); Dongsheng Zhu, Beijing (CN); Xiao Chen, Beijing (CN); Jian Xiong, Beijing (CN); Ke Shang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 1113 days.

(21) Appl. No.: 17/559,319

(22) Filed: Dec. 22, 2021

(65) Prior Publication Data

US 2022/0207206 A1 Jun. 30, 2022

(30) Foreign Application Priority Data

Dec. 24, 2020 (CN) .......................... 202011552584.5

(51) Int. Cl.
*G06F 30/20* (2020.01)
*G06F 30/17* (2020.01)
(Continued)

(52) U.S. Cl.
CPC .............. *G06F 30/17* (2020.01); *G06F 30/23* (2020.01); *G06F 2119/14* (2020.01); *G06F 2119/18* (2020.01)

(58) Field of Classification Search
CPC .............. G05B 19/406; G05B 23/0216; G05B 23/0254; G05B 19/0423; G05B 19/4097;
(Continued)

(56) References Cited

U.S. PATENT DOCUMENTS

| 6,701,006 B2 * | 3/2004 | Moore ................. G06V 10/757 |
| | | 382/294 |
| 9,965,574 B2 * | 5/2018 | Harkness ................ G06F 30/23 |
| 2004/0189944 A1 * | 9/2004 | Kaufman ............... G03B 31/00 |
| | | 352/10 |

FOREIGN PATENT DOCUMENTS

| CN | 109446539 A | 3/2019 |
| CN | 111145236 A | 5/2020 |
| CN | 111968004 A * | 11/2020 ............. G06T 17/00 |

OTHER PUBLICATIONS

Chinese Office Action regarding Patent Application No. 2020115525845, dated Sep. 5, 2022.

* cited by examiner

*Primary Examiner* — Rehana Perveen
*Assistant Examiner* — John David Hagler
(74) *Attorney, Agent, or Firm* — Harness, Dickey & Pierce, P.L.C.

(57) ABSTRACT

The embodiments of the present disclosure provide a physical digital twin modeling method and apparatus for an assembly, an electronic device and a medium. The physical digital twin modeling method for the assembly includes: generating a geometric distribution error surface of an assembly surface of a part; establishing an ideal model of the part without the geometric distribution error surface; integrating the geometric distribution error surface with the ideal model to establish a geometric distribution error integrated model of the part; assembling the geometric distribution error integrated model on a computer to establish a geometric digital twin model; and adding physical conditions to the geometric digital twin model of the assembly to establish a physical digital twin model of the assembly.

14 Claims, 6 Drawing Sheets

(51) Int. Cl.
G06F 30/23 (2020.01)
*G06F 119/14* (2020.01)
*G06F 119/18* (2020.01)

(58) Field of Classification Search
CPC ........ G05B 2219/50391; G05B 19/401; G05B
2219/37371; G05B 23/0243; G05B
19/048; G05B 2219/163; G05B
2219/32014; G05B 17/00; G05B 23/0297
See application file for complete search history.

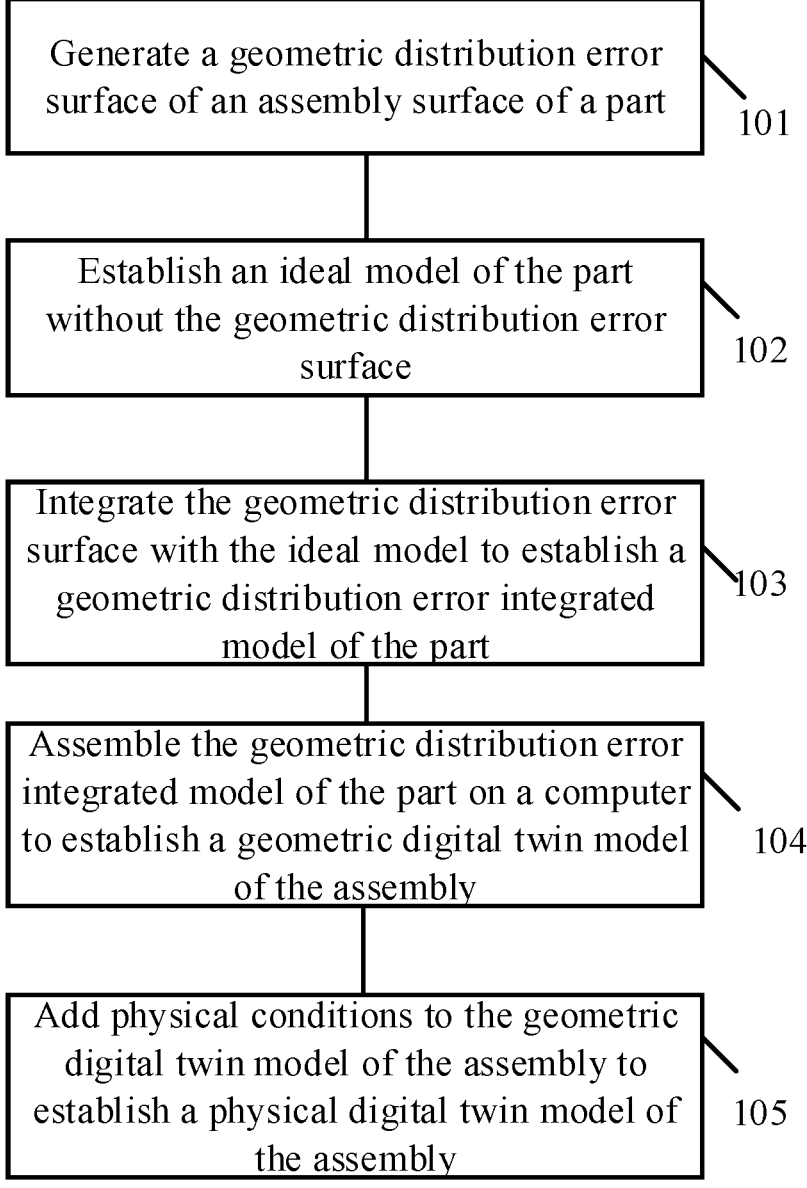

Generate a geometric distribution error surface of an assembly surface of a part — 101

Establish an ideal model of the part without the geometric distribution error surface — 102

Integrate the geometric distribution error surface with the ideal model to establish a geometric distribution error integrated model of the part — 103

Assemble the geometric distribution error integrated model of the part on a computer to establish a geometric digital twin model of the assembly — 104

Add physical conditions to the geometric digital twin model of the assembly to establish a physical digital twin model of the assembly — 105

FIG. 1

Geometric Distribution Error Surface Generating Module 701

Ideal Model Establishing Module 702

Geometric Distribution Error Integrated Model Establishing Module 703

Geometric Digital Twin Model Establishing Module 704

Physical Digital Twin Model Establishing Module 705

Electronic Device

1001

Processor

1002

Memory communication bus

1004

Memory    1003

PHYSICAL DIGITAL TWIN MODELING METHOD AND APPARATUS FOR ASSEMBLY, ELECTRONIC DEVICE AND MEDIUM

CROSS-REFERENCE TO RELATED APPLICATIONS

This application claims priority to Chinese Patent Application No. 202011552584.5, filed Dec. 24, 2020. the entire disclosure of which is incorporated by reference.

FIELD

The present disclosure relates to the technical field of mechanical simulation modeling, in particular to a physical digital twin modeling method and apparatus for an assembly, an electronic device and a medium.

BACKGROUND

This section provides background information related to the present disclosure which is not necessarily prior art.

At present, during the assembling of parts in mechanical products, a digital twin modeling method may be used to simulate and express an assembly model. However, in the existing digital twin modeling method, virtual models are all expressed as three-dimensional (3D) computer aided design (CAD) models of ideal parts and assemblies, which do not involve the accurate expression of geometric distribution errors of actual surfaces of parts. Besides, in the subsequent finite element simulation process, calculation is performed based on ideal 3D CAD models.

In a precision mechanical system, the geometric distribution errors of actual surfaces of parts directly affect the geometric and physical properties of assembled mechanical products. On the one hand, the geometric distribution errors of actual surfaces of parts affect the contact state of parts after assembly, thus affecting the geometric property of assembled mechanical products; and on the other hand, the difference in actual surfaces of parts will lead to the difference in stress distribution after parts make contact, which will directly affect the mechanical property of mechanical products in the subsequent working process of mechanical products.

SUMMARY

This section provides a general summary of the disclosure, and is not a comprehensive disclosure of its full scope or all of its features.

In view of the problems in the traditional art, the embodiments of the present disclosure provide a physical digital twin modeling method and apparatus for an assembly, an electronic device and a medium, to overcome the defect that geometric distribution errors of actual surfaces of parts are not considered, thus affecting the geometric and mechanical properties of an assembly in the traditional art, and a physical digital twin model of the assembly is established based on the surface geometric distribution errors to optimize the assembly processes and parameters.

Specifically, the embodiments of the present disclosure provide the following technical schemes:

In the first aspect, the embodiments of the present disclosure provides a physical digital twin modeling method for an assembly, including: generating a geometric distribution error surface of an assembly surface of a part; establishing an ideal model of the part without the geometric distribution error surface; integrating the geometric distribution error surface with the ideal model to establish a geometric distribution error integrated model of the part; assembling the geometric distribution error integrated model of the part on a computer to establish a geometric digital twin model of the assembly; and adding physical conditions to the geometric digital twin model of the assembly to establish a physical digital twin model of the assembly.

Further, the generating a geometric distribution error surface of an assembly surface of a part includes: measuring geometric distribution errors of the assembly surface to obtain geometric distribution error data; and generating an accurate geometric distribution error surface based on the geometric distribution error data with a surface fitting method. The surface fitting method includes but not limited to surface fitting based on orthogonal basis function, surface fitting based on high order polynomial and/or surface fitting based on spline curve.

Further, the measuring geometric distribution errors of the assembly surface to obtain geometric distribution error data includes: measuring the geometric distribution errors of the assembly surface with measuring equipment by using a point distribution method to obtain the geometric distribution error data.

Further, the generating the geometric distribution error surface based on the geometric distribution error data includes: generating the geometric distribution error surface through a surface reconstruction program based on the geometric distribution error data.

Further, the assembling the geometric distribution error integrated model of the part on a computer to establish a geometric digital twin model of the assembly includes: determining a contact mode of the assembly surface; and according to the determined contact mode, assembling the part on a premise of ensuring stable contact of the assembly surface, so as to establish the geometric digital twin model of the assembly.

Further, the physical conditions include one or more of material properties, mechanical conditions and temperature environment.

Further, the physical digital twin modeling method further includes: optimizing assembly processes and parameters of the geometric digital twin model and the physical digital twin model of the assembly based on assembly parameter requirements of the assembly.

Further, the optimizing assembly processes and parameters of the geometric digital twin model and the physical digital twin model of the assembly based on assembly parameter requirements of the assembly includes: acquiring virtual assembly parameters of the geometric digital twin model and/or the physical digital twin model; determining whether the virtual assembly parameters meet the assembly parameter requirements; and in response to that the virtual assembly parameters do not meet the assembly parameter requirements, adjusting the assembly processes and parameters of the geometric digital twin model and/or the physical digital twin model until the virtual assembly parameters meet the assembly parameter requirements. After the parameters are optimized, a state of the physical digital twin model is close to actual physical behavior of the assembly to the maximum extent.

Further, the acquiring virtual assembly parameters of the geometric digital twin model and/or the physical digital twin model includes: acquiring accuracy parameters of the geometric digital twin model; and/or acquiring property parameters of the physical digital twin model.

Further, the physical digital twin modeling method further includes: outputting optimized virtual assembly parameters and assembly processes and parameters of the optimized geometric digital twin model and physical digital twin model.

Further, the adding physical conditions to the geometric digital twin model of the assembly to establish a physical digital twin model of the assembly, includes: meshing the geometric digital twin model of the assembly, and setting material parameters, contact conditions, load conditions and temperature parameters to the geometric digital twin model of the assembly; carrying out assembly stress analysis by applying uniform screw pre-tightening force to the part of the assembly, to obtain a stress nephogram of the part of the assembly.

Further, the in response to that the virtual assembly parameters do not meet the assembly parameter requirements, adjusting the assembly processes and parameters of at least one of the geometric digital twin model or the physical digital twin model until the virtual assembly parameters meet the assembly parameter requirements includes: in response to that the accuracy parameters of the geometric digital twin model do not meet the assembly parameter requirements, adjusting assembly angles of two parts in the geometric digital twin model until the accuracy parameters of the geometric digital twin model meet the assembly parameter requirements.

Further, the property parameters include at least one of mechanical properties or vibration frequency, and the mechanical properties comprise at least one of stress distribution or maximum stress, the in response to that the virtual assembly parameters do not meet the assembly parameter requirements, adjusting the assembly processes and parameters of at least one of the geometric digital twin model or the physical digital twin model until the virtual assembly parameters meet the assembly parameter requirements includes: in response to that surface stress distribution around tightly fastened screws in the physical digital twin model does not meet the assembly parameter requirements, adjusting pre-tightening force applied to the screws until the property parameters meet the assembly parameter requirements.

In the second aspect, the present disclosure further provides a physical digital twin modeling apparatus for an assembly, including: a geometric distribution error surface generating module to generate a geometric distribution error surface of an assembly surface of a part; an ideal model establishing module to establish an ideal model of the part without the geometric distribution error surface; a geometric distribution error integrated model establishing module to integrate the geometric distribution error surface with the ideal model to establish a geometric distribution error integrated model of the part; a geometric digital twin model establishing module to assemble the geometric distribution error integrated model of the part on a computer to establish a geometric digital twin model of the assembly; and a physical digital twin model establishing module to add physical conditions to the geometric digital twin model of the assembly to establish a physical digital twin model of the assembly.

In the third aspect, the present disclosure provides an electronic device, including a memory, a processor, and a computer program stored in the memory and executable by the processor, in which when the processor executes the program, the steps of the physical digital twin modeling method for the assembly as described above.

In the fourth aspect, the present disclosure provides a non-transitory computer-readable storage medium on which a computer program is stored, in which the computer program, when executed by a processor, implements the steps of the physical digital twin modeling method for the assembly as described above.

In the fifth aspect, the present disclosure provides a computer program product comprising a computer program, in which the computer program, when executed by a processor, implements the steps of the physical digital twin modeling method for the assembly as described above.

According to the physical digital twin modeling method and apparatus for the assembly, the electronic device and the medium provided by the present disclosure, surface geometric distribution errors of an assembly surface of a part are considered on the basis of an ideal model, a geometric distribution error integrated model with a geometric distribution error surface is generated, and the geometric distribution error integrated model of the part is assembled on a computer to establish a geometric digital twin model and a physical digital twin model which may accurately describe the geometric and physical properties of the actual assembly, so as to provide a more accurate model basis for optimizing the assembly processes and assembly parameters of the actual assembly, thus ensuring the geometric property of the actual assembly and the mechanical property in subsequent use.

DRAWING DESCRIPTION

In order to more clearly explain the embodiments of the present disclosure or the technical solution in the traditional art, the following will briefly introduce the drawings needed in the description of the embodiments or the traditional art. Obviously, the drawings in the following description are only some embodiments of the present disclosure. For those of ordinary skill in the art, other drawings can be obtained according to the provided drawings without paying creative labor.

FIG. 1 is a flowchart of a physical digital twin modeling method for an assembly according to an embodiment of the present disclosure;

DETAILED DESCRIPTION

Figure 2:
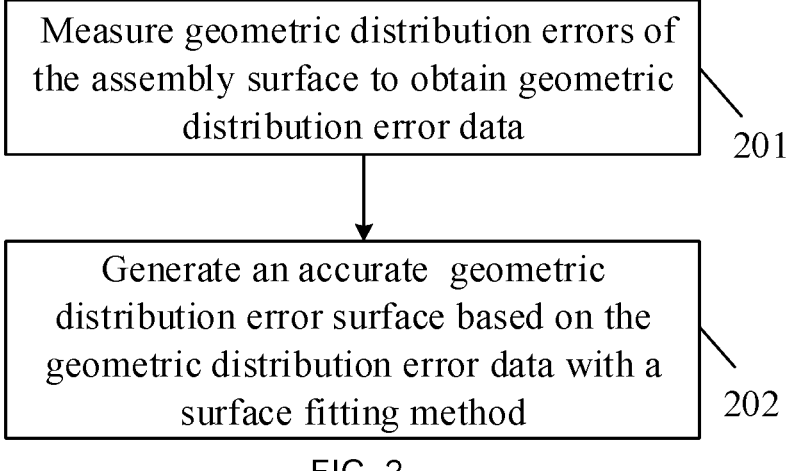
FIG. 2 is a detailed flowchart of step 101 in FIG. 1.

In order to make the objective, technical solution and advantages of the embodiments of the present disclosure clearer, the technical solution in the embodiments of the present disclosure will be described clearly and completely below with reference to the drawings for the embodiments of the present disclosure. Obviously, the described embodiments are only part of the embodiments of the present disclosure, not all of the embodiments. Based on the embodiments of the present disclosure, all other embodiments obtained by those of ordinary skill in the art without creative labor are within the scope of the present disclosure.

As mentioned above, in the traditional art, the modeling of an assembly is expressed as the assembling of parts with ideal surfaces, and surface geometric distribution errors of the parts are not considered. However, the surface geometric distribution errors of the parts directly affect the geometric and physical properties of the assembly, thus affecting the service performance of products in subsequent use. Therefore, the present disclosure provides a physical digital twin modeling method for an assembly. The content provided by the present disclosure will be described and explained in detail by specific embodiments with reference to the accompanying drawings.

FIG. 1 is a flowchart of a physical digital twin modeling method for an assembly according to an embodiment of the present disclosure. As shown in FIG. 1, the physical digital twin modeling method for the assembly according to the embodiment of the present disclosure includes:

step 101, generating a geometric distribution error surface of an assembly surface of a part;

step 102, establishing an ideal model of the part without the geometric distribution error surface;

step 103, integrating the geometric distribution error surface with the ideal model to establish a geometric distribution error integrated model of the part;

step 104, assembling the geometric distribution error integrated model of the part on a computer to establish a geometric digital twin model of the assembly; and step 105, adding physical conditions to the geometric digital twin model of the assembly to establish a physical digital twin model of the assembly.

In this embodiment, it should be noted that in step 101, the geometric distribution error surface is generated only for the assembly surface of the part, and other surfaces which are not for assembling are not processed this way. This embodiment is suitable for the case where there are two parts, and each part has an assembly surface. The respective assembly surfaces of the parts are in contact with each other to realize the assembling of the two parts, thereby forming the assembly. But the present disclosure is not limited thereto. The number and selection of the parts and the assembly surfaces of the parts may be determined according to actual assemblies and mechanical products. For example, this embodiment may be applied to the case where the number of the parts is three and each part has one or two assembly surfaces. For another example, this embodiment may be applied to the case where the number of the parts is two and each part has two assembly surfaces. In addition, it should be noted that the assembly surface may be a plane surface, a cylindrical surface, etc. Step 101 will be described in detail below with reference to FIG. 2.

In this embodiment, it should be noted that in step 102, the ideal model may be established in mechanical processing software. For example, a CAD ideal model of a part may be established in CAD software. The present disclosure does not limit the model type. The ideal model is a model which does not contain the above-mentioned geometric distribution error surface. That is, it is a model formed without considering the geometric distribution errors of the assembly surface of the part, and the assembly surface of the part is an ideal surface without geometric distribution errors in this model. In addition, it should be noted that an ideal model is established for each part.

In this embodiment, it should be noted that in step 103, the established geometric distribution error surface may be input into the mechanical processing software for establishing the ideal model, so as to establish the geometric distribution error integrated model of the part. The geometric distribution error integrated model is a model which considers the geometric distribution errors of the assembly surface of the part. That is to say, the geometric distribution errors of the assembly surface of the part are reflected in the geometric distribution error integrated model, so as to express an actual part assembly surface more accurately. In addition, it should be noted that the geometric distribution error integrated model is established for each part.

In this embodiment, it should be noted that in step 104, the geometric distribution error integrated model of each part is assembled on the computer, so as to establish the geometric digital twin model of the assembly. The geometric digital twin model of the assembly is geometrically twin with an actual assembly. The geometric digital twin model may accurately describe a geometrical profile and a contact state of the actual assembly, thus accurately characterizing the geometric accuracy of the actual assembly. Step 104 will be described in detail below with reference to FIG. 3.

In this embodiment, it should be noted that the physical conditions added in step 105 may include one or more of material properties, mechanical conditions and temperature environment. The physical digital twin model may be formed by adding the physical conditions to the geometric digital twin model of the assembly. The physical digital twin model is twin with the actual assembly in physical properties. The physical digital model may accurately describe the physical state of the actual assembly, thus accurately characterizing the physical properties of the actual assembly, such as mechanical properties and vibration frequency. The material properties include the material properties of the part, the mechanical conditions include pre-tightening force of assembling and fastening force of fasteners, and the temperature environment includes the assembly temperature of the assembly, etc.

As mentioned above, by considering the geometric distribution errors of the assembly surface of the part, the geometric digital twin model and physical digital twin model which may accurately describe the geometric state and physical state of the actual assembly may be established, so as to accurately provide guides for the assembly processes and parameters of the actual assembly.

FIG. 2 is a detailed flowchart of step 101 in FIG. 1. Referring to FIG. 2, step 101 includes the following steps:

step 201, measuring geometric distribution errors of the assembly surface to obtain geometric distribution error data; and step 202, generating the geometric distribution error surface based on the geometric distribution error data with a surface fitting method. The geometric distribution error surface is an accurate geometric distribution error surface of the assembly surface of the part. The surface fitting method includes but not limited to surface fitting based on orthogonal basis function, surface fitting based on high order polynomial and/or surface fitting based on spline curve.

In this embodiment, it should be noted that, in step 201, the geometric distribution errors of the assembly surface may be measured with measuring equipment by using a point distribution method to obtain the geometric distribution error data. Specifically, according to an established point distribution plan, each point is measured in turn with the measuring equipment to generate the geometric distribution error data, which may be point cloud data. It should be noted that the present disclosure does not limit the geometric distribution error measurement method, and any other measurement methods may be adopted.

In this embodiment, it should be noted that in step 202, the geometric distribution error data generated in step 201 may be input into data processing software for processing, so as to generate the geometric distribution error surface by a surface reconstruction program. In addition, it should be noted that in order to integrate the geometric distribution error surface with the ideal model, it is necessary to generate a geometric distribution error surface with the same format as the ideal model. For example, if the ideal model is a CAD ideal model, the geometric distribution error surface may be in a format readable by the CAD software. Therefore, the geometric distribution error surface generated by the surface reconstruction program may be output in a format readable by the CAD software. Then, the geometric distribution error surface in the format readable by the CAD software is input into the CAD software and integrated with the CAD ideal model, so as to establish the geometric distribution error integrated model.

Figure 3:
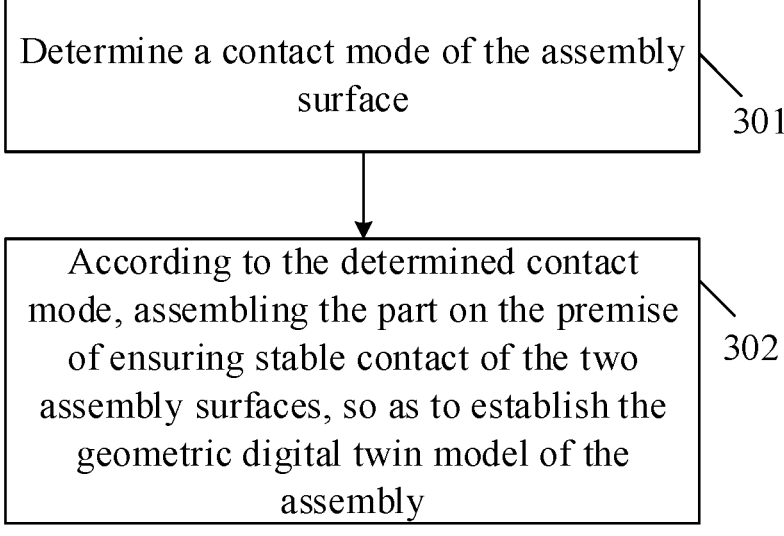
FIG. 3 is a detailed flowchart of step 104 in FIG. 1.

FIG. 3 is a detailed flowchart of step 104 in FIG. 1. Referring to FIG. 3, step 104 specifically includes the following steps:

step 301, determining a contact mode of the assembly surface; and step 302, according to the determined contact mode, assembling the part on the premise of ensuring stable contact of the two assembly surfaces, so as to establish the geometric digital twin model of the assembly.

In this embodiment, it should be noted that the contact mode of the assembly surfaces is used to represent a mode that the assembly surfaces may stably make contact when assembled with each other. The actual assembling of two parts is simulated by assembling the two assembly surfaces in contact with each other through the obtained contact mode. In addition, it should be noted that different contact modes may be obtained for different kinds of assembly surfaces. Specifically, for cylindrical assembly surfaces, according to the principle of determining a circle by three points, a circle with a minimum radius on a corresponding assembly surface may be found, then a stable contact point which is not on the circle with the minimum radius is obtained, then corresponding contact circles and points make contact to allow the two parts to be assembled on the computer, and the two parts are assembled on the computer to form the assembly, thus forming the geometric digital twin model of the assembly. Because the geometric distribution error integrated model of the two parts assembled on the computer contains the geometric distribution error surface of the assembly surface, that is, the geometric distribution error surface of the assembly surface is considered, the geometric digital twin model of the assembly formed after assembling on the computer may accurately reflect the accuracy parameters of the actual assembly.

Figure 4:
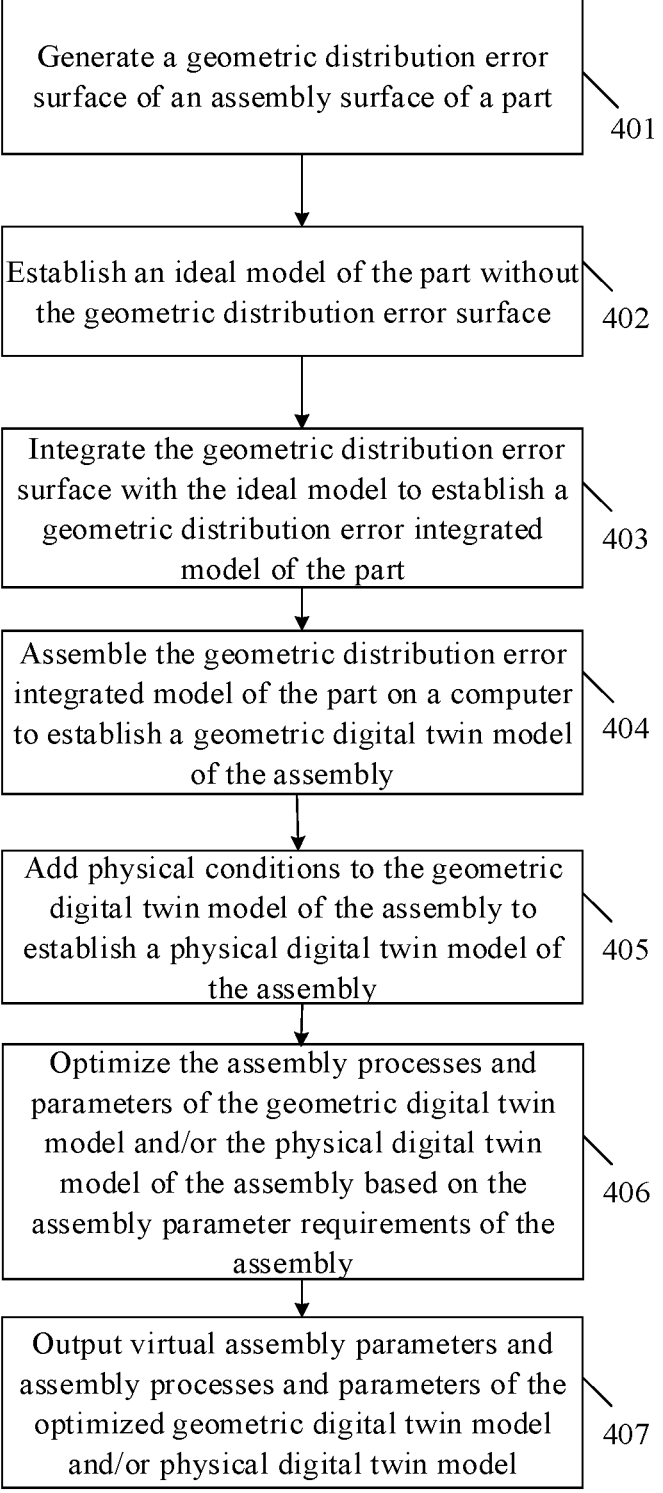
FIG. 4 is a flowchart of a physical digital twin modeling method for an assembly according to another embodiment of the present disclosure.

FIG. 4 is a flowchart of a physical digital twin modeling method for an assembly according to another embodiment of the present disclosure. Referring to FIG. 4, the physical digital twin modeling method for the assembly according to another embodiment of the present disclosure includes the following steps:

step 401, generating a geometric distribution error surface of an assembly surface of a part;

step 402, establishing an ideal model of the part without the geometric distribution error surface;

step 403, integrating the geometric distribution error surface with the ideal model to establish a geometric distribution error integrated model of the part;

step 404, assembling the geometric distribution error integrated model of the part on a computer to establish a geometric digital twin model of the assembly; and step 405, adding physical conditions to the geometric digital twin model of the assembly to establish a physical digital twin model of the assembly;

step 406, optimizing assembly processes and parameters of the geometric digital twin model and/or the physical digital twin model of the assembly based on the assembly parameter requirements of the assembly; and step 407, outputting optimized virtual assembly parameters and assembly processes and parameters of the geometric digital twin model and/or physical digital twin model.

In this embodiment, it should be noted that steps 401 to 405 are basically the same as steps 101 to 105 described above, which will not be described in detail here.

In step 406, the assembly parameter requirements of the assembly represent the assembly parameter requirements of the actual assembly, such as accuracy requirements and property requirements of the assembly. The geometric digital twin model and physical digital twin model of the assembly may output the virtual assembly parameters. By comparing the virtual assembly parameters with the assembly parameter requirements, whether the current geometric digital twin model and physical digital twin model of assembly meet actual assembly needs may be determined. The geometric digital twin model and/or the physical digital twin model is/are optimized based on the comparison results, so that the virtual assembly parameters of the geometric digital twin model and the physical digital twin model meet the assembly parameter requirements, so as to accurately guiding the assembling of the actual assembly.

In step 407, after the geometric digital twin model and the physical digital twin model are optimized, the virtual assembly parameters and the assembly processes are output to accurately guide the assembling of the actual assembly.

Figure 5:
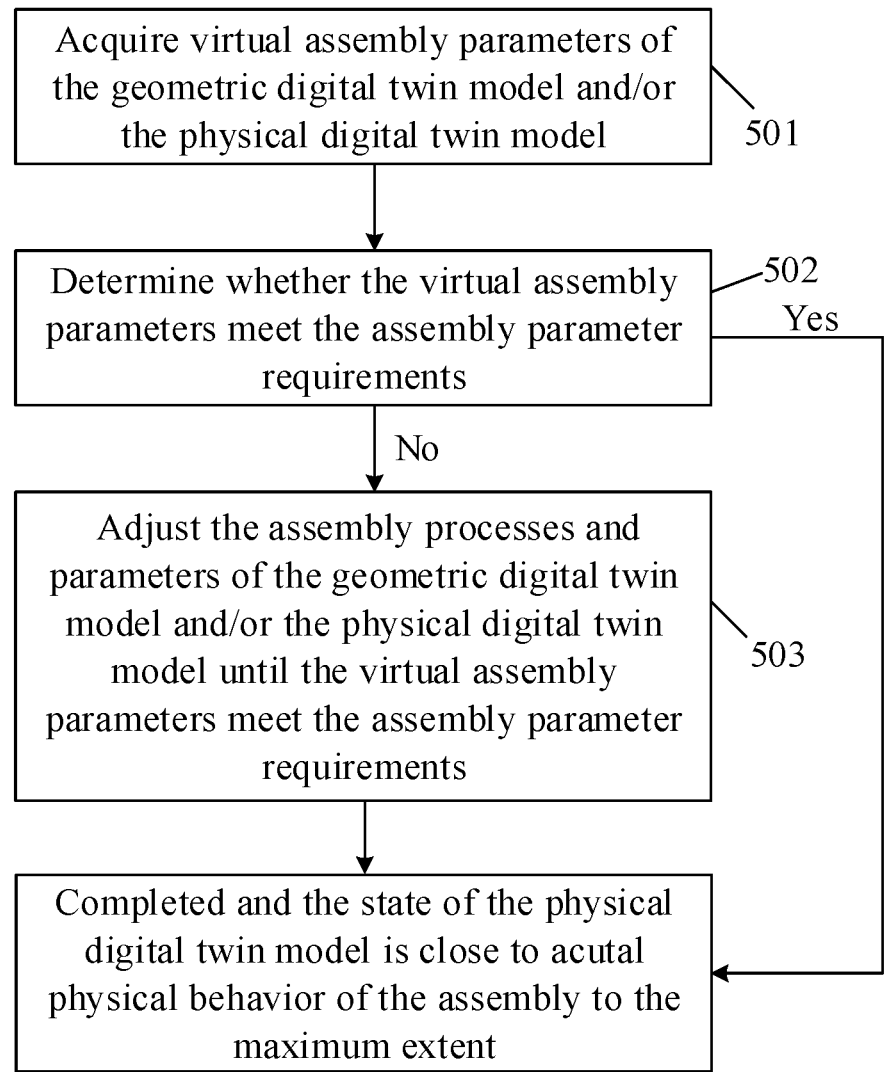
FIG. 5 is a detailed flowchart of step 406 in FIG. 4.

FIG. 5 is a detailed flowchart of step 406 in FIG. 4. Referring to FIG. 5, step 406 includes the following steps:

step 501, acquiring virtual assembly parameters of the geometric digital twin model and/or the physical digital twin model;

step 502, determining whether the virtual assembly parameters meet the assembly parameter requirements; and step 503, when the virtual assembly parameters do not meet the assembly parameter requirements, adjusting the assembly processes and parameters of the geometric digital twin model and/or the physical digital twin model until the virtual assembly parameters meet the assembly parameter requirements.

In this embodiment, it should be noted that the virtual assembly parameters include accuracy parameters and property parameters, in which the accuracy parameters are determined by the geometric digital twin model, and the property parameters are determined by the physical digital twin model. The accuracy parameters may include geometric assembly accuracy. When the accuracy parameters do not meet the assembly parameter requirements, an assembly angle of the geometric digital twin model on the computer may be adjusted to improve the accuracy parameters. The property parameters may include mechanical properties, vibration frequency, etc. The mechanical properties may include stress distribution, maximum stress, etc. Different kinds of property parameters may be obtained based on the types of the added physical conditions. For example, a stress distribution state may be obtained by adding the distribution and pre-tightening force of fastening screws. When the property parameters do not meet the assembly parameter requirements, the physical conditions of the physical digital twin model may be adjusted. For example, when the surface stress distribution around the tightly fastened screws is uneven, the pre-tightening force of the screws may be adjusted to improve the stress distribution state and meet the assembly parameter requirements.

Figure 6:
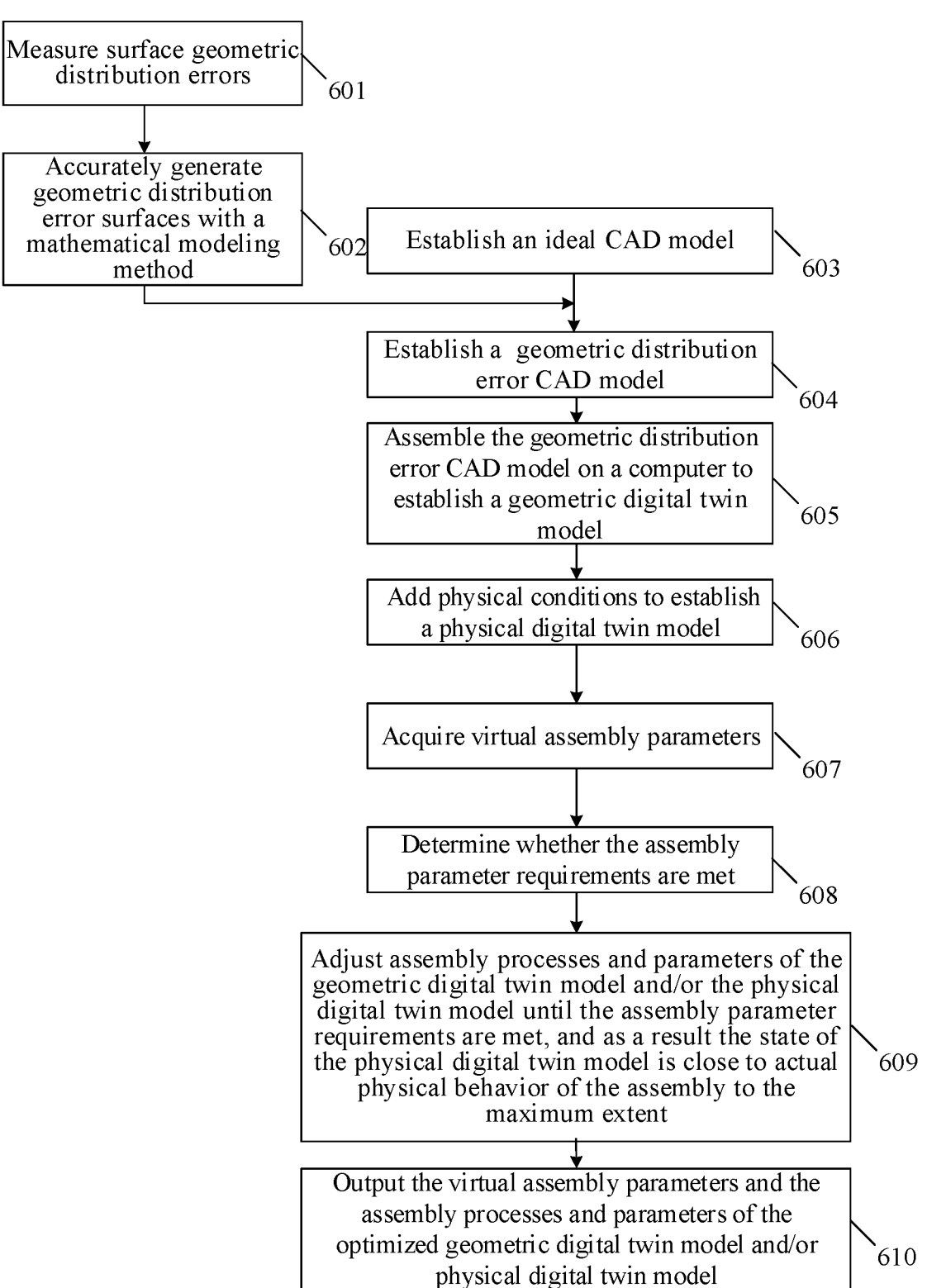
FIG. 6 is a flowchart of a specific example of a physical digital twin modeling method for engine component assembling according to an embodiment of the present disclosure.

FIG. 6 is a flowchart of a specific example of a physical digital twin model for engine part assembling according to an embodiment of the present disclosure. In FIG. 6, the engine part assembling is taken as an example, and the following steps are included:

Step 601, measuring surface geometric distribution errors of assembly surfaces of engine parts, in which measuring equipment is used to measure the assembly surfaces, and according to an established point distribution plan, points are measured in turn, so as to obtain point cloud data, that is, geometric distribution error data. Geometric distribution error measurement is not performed on other surfaces which are not for assembling.

Step 602, importing the measured point cloud data into data processing software, generating geometric distribution error surfaces through a surface reconstruction program, and outputting the geometric distribution error surfaces in an IGES format readable by CAD software. The geometric distribution error surfaces may be generated with a mathematical modeling method.

Step 603, establishing ideal CAD models of the engine parts, which are models with ideal surfaces without considering the surface geometric distribution errors.

Step 604, importing the geometric distribution error surfaces into the CAD software so as to be integrated with the ideal CAD models, and establishing CAD models, of which the assembly surfaces are geometric distribution error surfaces, as shown in FIG. 6.

Step 605, assembling the geometric distribution error CAD models of two parts on a computer in the CAD software to establish a geometric digital twin model of the assembly. Firstly, an assembly mode of the assembly surfaces is solved, assembling is carried out on the computer by an obtained contact mode while ensuring the stable contact between the two surfaces, the established assembly with the geometric distribution error surfaces is the geometric digital twin model, and an axis of the upper part is slightly deflected after being assembled and is not on an axis of the lower part due to a flatness error of the two assembly surfaces.

Step 606, adding physical conditions to establish a physical digital twin model, in which a mesh is formed on the geometric digital twin model of the assembly through simulation software, material parameters, contact conditions, load conditions and temperature parameters are set to the geometric digital twin model of the assembly, assembly stress analysis is carried out to obtain a stress nephogram of the parts, uniform screw pre-tightening force is applied to the parts to obtain a stress nephogram (also called stress distribution nephogram), the stress nephogram may be used to analyze the mechanical properties of the assembly, such as stress distribution state and maximum stress, and the stress nephogram is the physical digital twin model of the assembly with the geometric distribution error surfaces.

Step 607, acquiring virtual assembly parameters of the geometric digital twin model and the physical digital twin model. Accuracy parameters are calculated by the geometric digital twin model, property parameters are calculated by the physical digital twin model, and the accuracy parameters and the property parameters are evaluated by being compared with evaluation criteria (i.e., assembly parameter requirements). In the geometric digital twin model, the axis of the upper part is slightly deflected after being assembled and is not on the axis of the lower part due to the flatness error of the two assembly surfaces. In this embodiment, an axis deflection angle is the accuracy parameter. Due to the surface geometric distribution errors, after the assembling, under the condition of uniform assembly force, the surface stress distribution around the tightly fastened screws in the physical digital twin model is uneven. In this case, in this embodiment, the uneven stress distribution state is the property parameter.

Step 608, determining whether the virtual assembly parameters meet the assembly parameter requirements by comparing the above accuracy parameters and property parameters with engine assembly parameter requirements.

Step 609, when the virtual assembly parameters do not meet the assembly parameter requirements, adjusting the assembly processes and parameters of the geometric digital twin model and/or the physical digital twin model until the virtual assembly parameters meet the assembly parameter requirements. When the accuracy parameters do not meet the requirements, assembly angles of the two parts in the geometric digital twin model are adjusted until the accuracy parameters meet the engine assembly parameter requirements; and when the property parameters do not meet the requirements, a stress distribution state of a tightening part of a screw may be adjusted by adjusting the pre-tightening force of the screw until the property parameters meet the engine assembly parameter requirements. After the parameters are optimized, the state of the optimized physical digital twin model is close to actual physical behavior of the assembly, or in other words, is close to physical behavior of the actual assembly to the maximum extent.

Step 610, outputting optimized virtual assembly parameters and assembly processes and parameters of the geometric digital twin model and physical digital twin model. When the virtual assembly parameters meet the assembly parameter requirements, the optimized geometric digital twin model and physical digital twin model are obtained, and then the accuracy parameters of the geometric digital twin model and the property parameters of the physical digital twin model, as well as the assembly processes and parameters of the assembly, are output, so as to guide the assembling of actual engine components.

As mentioned above, error measurement, error modeling, and three-dimensional integration of the distribution error surface and the ideal model are carried out on the assembly surfaces of the engine parts. By assembling the CAD model with the geometric distribution error surface on the computer, the geometric digital twin model is obtained. On this basis, the physical conditions such as material properties, mechanical conditions and temperature environment are added, so that the physical digital twin model is established. Finally, the purposes of accuracy and property prediction and assembly processes and parameter optimization are realized.

Figures 7, 8:
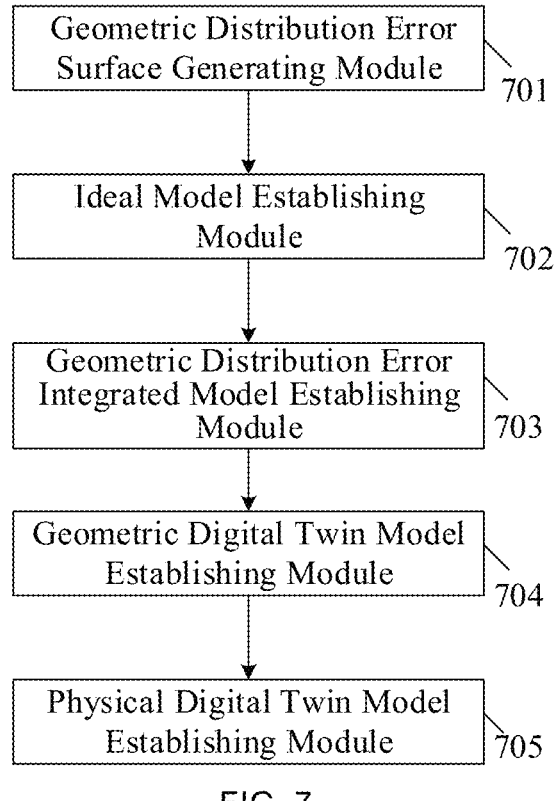
FIG. 7 is a structural diagram of a physical digital twin modeling apparatus for an assembly according to an embodiment of the present disclosure.
FIG. 8 is an electronic device according to an embodiment of the present disclosure.

FIG. 7 is a structural diagram of a physical digital twin modeling apparatus for an assembly according to an embodiment of the present disclosure. Referring to FIG. 7, the physical digital twin modeling apparatus for the assembly provided by the present disclosure includes:

a geometric distribution error surface generating module 701 to generate a geometric distribution error surface of an assembly surface of a part;

an ideal model establishing module 702 to establish an ideal model of the part without the geometric distribution error surface;

a geometric distribution error integrated model establishing module 703 to integrate the geometric distribution error surface with the ideal model to establish a geometric distribution error integrated model of the part;

a geometric digital twin model establishing module 704 to assemble the geometric distribution error integrated model of the part on a computer to establish a geometric digital twin model of the assembly; and a physical digital twin model establishing module 705 to add physical conditions to the geometric digital twin model of the assembly to establish a physical digital twin model of the assembly.

In this embodiment, it should be noted that since the physical digital twin modeling apparatus for the assembly provided by the embodiment of the present disclosure can be used to perform the physical digital twin modeling methods for the assembly described in the above embodiments, and their working principle and beneficial effects are similar, so the apparatus will not be described in detail here. For details, please refer to the introduction of the above embodiments.

In this embodiment, it should be noted that different modules in the apparatus according to the embodiment of the present disclosure may be integrated or deployed separately. The above modules may be merged into one module, and may also be further split into several sub-modules. Based on the same inventive concept, another embodiment of the present disclosure provides an electronic device, as shown in FIG. 8, which specifically includes a processor 1001, a memory 1002, a communication interface 1003 and a communication bus 1004; in which the processor 1001, the memory 1002 and the communication interface 1003 communicate with each other through the communication bus 1004.

The processor 1001 is configured to call a computer program in the memory 1002, and when executed by the processor, the computer program implements all the steps of the physical digital twin modeling methods for the assembly.

It can be understood that one may refer to the description of the above embodiments for the refined functions and extended functions that the computer program may perform.

Based on the same inventive concept, another embodiment of the present disclosure provides a non-transitory computer readable storage medium, on which a computer program is stored, and when executed by a processor, the computer program implements all the steps of the physical digital twin modeling methods for the assembly.

It can be understood that one may refer to the description of the above embodiments for the refined functions and extended functions that the computer program may perform.

Based on the same inventive concept, another embodiment of the present disclosure provides a computer program product including a computer program, and when executed by a processor, the computer program implements all the steps of the physical digital twin modeling methods for the assembly.

It can be understood that one may refer to the description of the above embodiments for the refined functions and extended functions that the computer program may perform.

In addition, logic instructions in the above memory may be realized in the form of software functional units and may be stored in a computer readable storage medium when sold or used as an independent product. Based on this understanding, the technical scheme of the present disclosure in essence, or the part contributing to the traditional art, or part of the technical scheme may be embodied in the form of a software product, which is stored in a storage medium and includes a number of instructions to cause a computer device (which may be a personal computer, a server, or a network device, etc.) to perform all or part of the steps of the method described in various embodiments of the present disclosure. The aforementioned storage medium includes: USB flash disk, removable hard disk, read-only memory (ROM), random access memory (RAM), magnetic disk or optical disk and other media which can store program codes.

The apparatus embodiments described above are only schematic, in which the units described as separate parts may or may not be physically separated, and the parts displayed as units may or may not be physical units, i.e., may be located in one place or may be distributed over multiple network units. Some or all of the modules may be selected according to actual needs to achieve the purpose of the embodiments of the present disclosure. One of ordinary skill in the art can understand and implement it without creative labor.

From the description of the above embodiments, those skilled in the art may clearly understand that each embodiment may be realized by means of software together with necessary general hardware platforms, and of course, the embodiments may also be realized by hardware. Based on this understanding, the technical scheme of the present disclosure in essence, or the part that contributes to the traditional art may be embodied in the form of a software product, which may be stored in a computer readable storage medium, such as ROM/RAM, magnetic disk, and optical disk, and includes several instructions to make a computer device (which may be a personal computer, a server, or a network device, etc.) execute the physical digital twin modeling method for the assembly described in each embodiment or some parts of the embodiment.

In addition, relational terms herein such as first and second are only used to distinguish one entity or operation from another entity or operation, and do not necessarily require or imply any such actual relationship or order between these entities or operations. The terms "comprise", "include" or any other variations thereof, are intended to cover a non-exclusive inclusion, such that a process, method, article, or equipment which includes a list of elements does not include only those elements but also other elements not expressly listed or inherent to such process, method, article, or equipment. Without further limitation, an element defined by the statement "includes a . . . " does not exclude the presence of another identical element in a process, method, article or device that includes the element.

In addition, descriptions referring to the terms "one embodiment", "some embodiments", "example", "specific example", or "some examples" herein mean that specific features, structures, materials or characteristics described in connection with the embodiment or example are included in at least one embodiment or example of the present disclosure. In this specification, the schematic expression of the above terms does not necessarily refer to the same embodiment or example. Furthermore, the specific features, structures, materials or characteristics described may be combined in any one or more embodiments or examples in a suitable manner. In addition, those skilled in the art may combine different embodiments or examples and features of different embodiments or examples described in this specification without contradicting each other.

Finally, it should be noted that the above embodiments are only used to illustrate the technical solutions of the present disclosure, but not to limit the present disclosure. Although the present disclosure has been described in detail with reference to the foregoing embodiments, those of ordinary skill in the art should understand that the technical solutions described in the foregoing embodiments can still be modified, or some of the technical features can be equivalently replaced, and these modifications or substitutions do not make the essence of the corresponding technical solutions deviate from the spirit and scope of the technical solutions of the embodiments of the present disclosure.

Further areas of applicability will become apparent from the description provided herein. The description and specific examples in this summary are intended for purposes of illustration only and are not intended to limit the scope of the present disclosure.

What is claimed is:

1. A physical digital twin modeling method for an assembly, being executed by a computer, the method comprising: generating a geometric distribution error surface of an assembly surface of a part, which is a mechanical part, by measuring geometric distribution errors of the assembly surface to obtain geometric distribution error data, the geometric distribution error data being point cloud data; establishing an ideal model of the part without the geometric distribution error surface; integrating the geometric distribution error surface with the ideal model to establish a geometric distribution error integrated model of the part; assembling the geometric distribution error integrated model of the part on the computer to establish a geometric digital twin model of the assembly; adding physical conditions to the geometric digital twin model of the assembly to establish a physical digital twin model of the assembly, wherein the physical conditions include one or more of material properties, mechanical conditions and temperature environment; and assembling the part of the assembly in an actual environment according to the physical digital twin model of the assembly; wherein the assembling the geometric distribution error integrated model of the part on a computer to establish a geometric digital twin model of the assembly is based on determining a stable contact mode between the geometric distribution error surface and another geometric distribution error surface corresponding to another mechanical part of the assembly, and the stable contact mode is determined from a plurality of three-point contact modes between the geometric distribution error surface and the another geometric distribution error surface; and the method comprises: according to the determined stable contact mode, assembling the part on a premise of ensuring stable contact of the assembly surface, so as to establish the geometric digital twin model of the assembly; wherein the physical conditions include one or more of material properties, mechanical conditions and temperature environment, and the adding physical conditions to the geometric digital twin model of the assembly to establish a physical digital twin model of the assembly, comprises: meshing the geometric digital twin model of the assembly, and setting material parameters, contact conditions, load conditions and temperature parameters to the geometric digital twin model of the assembly; carrying out assembly stress analysis by applying uniform screw pre-tightening force to the part of the assembly, to obtain a stress nephogram of the part of the assembly, and determining the stress nephogram of the part as the physical digital twin model of the assembly; and wherein the virtual assembly parameters include accuracy parameters and property parameters, and the property parameters include at least one of mechanical properties or vibration frequency, and the mechanical properties comprise at least one of stress distribution or maximum stress, and the method further comprises: in response to that surface stress distribution around tightly fastened screws in the physical digital twin model does not meet the assembly parameter requirements, adjusting pre-tightening force applied to the screws until property parameters meet the assembly parameter requirements.

2. The physical digital twin modeling method for the assembly according to claim 1, wherein the generating a geometric distribution error surface of an assembly surface of a part comprises:

generating the geometric distribution error surface based on the geometric distribution error data with a surface fitting method, wherein the surface fitting method includes at least one of surface fitting based on orthogonal basis function, surface fitting based on high order polynomial or surface fitting based on spline curve.

3. The physical digital twin modeling method for the assembly according to claim 1, further comprising:

optimizing assembly processes and parameters of the geometric digital twin model and the physical digital twin model of the assembly based on assembly parameter requirements of the assembly.

4. The physical digital twin modeling method for the assembly according to claim 3, wherein the optimizing assembly processes and parameters of the geometric digital twin model and the physical digital twin model of the assembly based on assembly parameter requirements of the assembly comprises:

acquiring virtual assembly parameters of at least one of the geometric digital twin model or the physical digital twin model;

determining whether the virtual assembly parameters meet the assembly parameter requirements; and in response to that the virtual assembly parameters do not meet the assembly parameter requirements, adjusting the assembly processes and parameters of at least one of the geometric digital twin model or the physical digital twin model until the virtual assembly parameters meet the assembly parameter requirements, wherein after the parameters are optimized, a state of the physical digital twin model is close to actual physical behavior of the assembly.

5. The physical digital twin modeling method for the assembly according to claim 4, wherein the acquiring virtual assembly parameters of at least one of the geometric digital twin model or the physical digital twin model comprises at least one of the following:

acquiring accuracy parameters of the geometric digital twin model; or acquiring property parameters of the physical digital twin model.

6. The physical digital twin modeling method for the assembly according to claim 4, further comprising:

outputting optimized virtual assembly parameters and assembly processes and parameters of the geometric digital twin model and physical digital twin model.

7. The physical digital twin modeling method for the assembly according to claim 5, wherein the in response to that the virtual assembly parameters do not meet the assembly parameter requirements, adjusting the assembly processes and parameters of at least one of the geometric digital twin model or the physical digital twin model until the virtual assembly parameters meet the assembly parameter requirements comprises:

in response to that the accuracy parameters of the geometric digital twin model do not meet the assembly parameter requirements, adjusting assembly angles of two parts in the geometric digital twin model until the accuracy parameters of the geometric digital twin model meet the assembly parameter requirements.

8. An electronic device, comprising a memory, a processor, and a computer program stored in the memory and executable by the processor, wherein when the processor executes the program, the following steps are performed:

generating a geometric distribution error surface of an assembly surface of a part which is a mechanical part, by measuring geometric distribution errors of the assembly surface to obtain geometric distribution error data, the geometric distribution error data being point cloud data;

establishing an ideal model of the part without the geometric distribution error surface;

integrating the geometric distribution error surface with the ideal model to establish a geometric distribution error integrated model of the part;

assembling the geometric distribution error integrated model of the part on a computer to establish a geometric digital twin model of the assembly;

adding physical conditions to the geometric digital twin model of the assembly to establish a physical digital twin model of the assembly, wherein the physical conditions include one or more of material properties, mechanical conditions and temperature environment; and assembling the part of the assembly in an actual environment according to the physical digital twin model of the assembly;

wherein the assembling the geometric distribution error integrated model of the part on a computer to establish a geometric digital twin model of the assembly is based on determining a stable contact mode between the geometric distribution error surface and another geometric distribution error surface corresponding to another mechanical part of the assembly, and the stable contact mode is determined from a plurality of three-point contact modes between the geometric distribution error surface and the another geometric distribution error surface; and the following step is performed:

according to the determined stable contact mode, assembling the part on a premise of ensuring stable contact of the assembly surface, so as to establish the geometric digital twin model of the assembly;

wherein the adding physical conditions to the geometric digital twin model of the assembly to establish a physical digital twin model of the assembly, comprises:

meshing the geometric digital twin model of the assembly, and setting material parameters, contact conditions, load conditions and temperature parameters to the geometric digital twin model of the assembly;

carrying out assembly stress analysis by applying uniform screw pre-tightening force to the part of the assembly, to obtain a stress nephogram of the part of the assembly, and determining the stress nephogram of the part as the physical digital twin model of the assembly; and wherein the virtual assembly parameters include accuracy parameters and property parameters, and the property parameters include at least one of mechanical properties or vibration frequency, and the mechanical properties comprise at least one of stress distribution or maximum stress, and the method further comprises:

in response to that surface stress distribution around tightly fastened screws in the physical digital twin model does not meet the assembly parameter requirements, adjusting pre-tightening force applied to the screws until the property parameters meet the assembly parameter requirements.

9. The electronic device according to claim 8, wherein the generating a geometric distribution error surface of an assembly surface of a part comprises:

generating the geometric distribution error surface based on the geometric distribution error data with a surface fitting method, wherein the surface fitting method includes at least one of surface fitting based on orthogonal basis function, surface fitting based on high order polynomial or surface fitting based on spline curve.

10. The electronic device according to claim 8, wherein when the processor executes the program, the following step is further performed:

optimizing assembly processes and parameters of the geometric digital twin model and the physical digital twin model of the assembly based on assembly parameter requirements of the assembly.

11. The electronic device according to claim 10, wherein the optimizing assembly processes and parameters of the geometric digital twin model and the physical digital twin model of the assembly based on assembly parameter requirements of the assembly comprises:

acquiring virtual assembly parameters of at least one of the geometric digital twin model or the physical digital twin model;

determining whether the virtual assembly parameters meet the assembly parameter requirements; and in response to that the virtual assembly parameters do not meet the assembly parameter requirements, adjusting the assembly processes and parameters of at least one of the geometric digital twin model or the physical digital twin model until the virtual assembly parameters meet the assembly parameter requirements, wherein after the parameters are optimized, state of the physical digital twin model is close to actual physical behavior of the assembly.

12. The electronic device according to claim 11, wherein the acquiring virtual assembly parameters of at least one of the geometric digital twin model and/or the physical digital twin model comprises at least one of the following:

acquiring accuracy parameters of the geometric digital twin model; or acquiring property parameters of the physical digital twin model.

13. The electronic device according to claim 11, wherein when the processor executes the program, the following step is performed:

outputting optimized virtual assembly parameters and assembly processes and parameters of the geometric digital twin model and physical digital twin model.

14. A non-transitory computer-readable storage medium on which a computer program is stored, wherein the computer program, when executed by a processor, implements the following steps: generating a geometric distribution error surface of an assembly surface of a part which is a mechanical part, by measuring geometric distribution errors of the assembly surface to obtain geometric distribution error data, the geometric distribution error data being point cloud data; establishing an ideal model of the part without the geometric distribution error surface; integrating the geometric distribution error surface with the ideal model to establish a geometric distribution error integrated model of the part; assembling the geometric distribution error integrated model of the part on a computer to establish a geometric digital twin model of the assembly; adding physical conditions to the geometric digital twin model of the assembly to establish a physical digital twin model of the assembly, wherein the physical conditions include one or more of material properties, mechanical conditions and temperature environment; and assembling the part of the assembly in an actual environment according to the physical digital twin model of the assembly; wherein the assembling the geometric distribution error integrated model of the part on a computer to establish a geometric digital twin model of the assembly is based on determining a stable contact mode between the geometric distribution error surface and another geometric distribution error surface corresponding to another mechanical part of the assembly, and the stable contact mode is determined from a plurality of three-point contact modes between the geometric distribution error surface and the another geometric distribution error surface; and the following step is implemented: according to the determined stable contact mode, assembling the part on a premise of ensuring stable contact of the assembly surface, so as to establish the geometric digital twin model of the assembly; wherein the adding physical conditions to the geometric digital twin model of the assembly to establish a physical digital twin model of the assembly, comprises: meshing the geometric digital twin model of the assembly, and setting material parameters, contact conditions, load conditions and temperature parameters to the geometric digital twin model of the assembly; carrying out assembly stress analysis by applying uniform screw pre-tightening force to the part of the assembly, to obtain a stress nephogram of the part of the assembly, and determining the stress nephogram of the part as the physical digital twin model of the assembly; and wherein the virtual assembly parameters include accuracy parameters and property parameters, and the property parameters include at least one of mechanical properties or vibration frequency, and the mechanical properties comprise at least one of stress distribution or maximum stress, and the method further comprises: in response to that surface stress distribution around tightly fastened screws in the physical digital twin model does not meet the assembly parameter requirements, adjusting pre-tightening force applied to the screws until the property parameters meet the assembly parameter requirements.

* * * * *